(12) United States Patent
Eftekharzadeh

(10) Patent No.: US 9,677,262 B2
(45) Date of Patent: Jun. 13, 2017

(54) APPARATUS FOR PRESSURIZED CONVEYANCE IN GRAVITY CONDUITS

(71) Applicant: Shahriar Eftekharzadeh, Torrance, CA (US)

(72) Inventor: Shahriar Eftekharzadeh, Torrance, CA (US)

( * ) Notice: Subject to any disclaimer, the term of this patent is extended or adjusted under 35 U.S.C. 154(b) by 289 days.

(21) Appl. No.: 14/679,854

(22) Filed: Apr. 6, 2015

(65) Prior Publication Data
US 2016/0289946 A1 Oct. 6, 2016

(51) Int. Cl.
*F16L 55/00* (2006.01)
*E03F 3/04* (2006.01)
*F16L 9/19* (2006.01)

(52) U.S. Cl.
CPC ............... *E03F 3/043* (2013.01); *F16L 9/19* (2013.01)

(58) Field of Classification Search
CPC .................................. E03F 3/043; F16L 9/19
USPC ................. 138/103, 105–108, 114, 118, 119
See application file for complete search history.

(56) References Cited

U.S. PATENT DOCUMENTS

| | | | | |
|---|---|---|---|---|
| 1,217,398 A * | 2/1917 | Bonnell | ............... | H02G 3/0418 138/107 |
| 4,338,045 A * | 7/1982 | Cour | ........................ | F16L 1/20 138/105 |
| 7,004,681 B2 * | 2/2006 | Penza | ....................... | E03F 3/04 405/183.5 |
| 7,637,286 B2 * | 12/2009 | Schulte | ..................... | E03F 3/04 138/108 |
| 7,691,312 B2 * | 4/2010 | Prusak | ...................... | E03F 3/00 138/108 |
| 7,882,856 B2 * | 2/2011 | Berry, Jr. | .................. | F16L 7/00 138/108 |
| 2003/0034080 A1 * | 2/2003 | Second | .................. | G02B 6/508 138/115 |

* cited by examiner

*Primary Examiner* — Patrick F Brinson

(57) ABSTRACT

An apparatus for increasing the utility of gravity conduits by using their underutilized headspace for pressurized conveyance.

3 Claims, 5 Drawing Sheets

APPARATUS FOR PRESSURIZED CONVEYANCE IN GRAVITY CONDUITS

FIELD OF THE INVENTION

The present invention is in the field of devices for conveyance of fluids. More specifically, the present invention relates to increasing the utility of gravity conduits by using their underutilized headspace for pressurized conveyance.

BACKGROUND OF THE INVENTION

Gravity conduits in urban settings are widely used for conveyance of sewage and stormwater. They are designed to convey the peak flow rate under partially full flow conditions, while the actual day-to-day flow rate and depth of flow are substantially less.

Separate sanitary sewers experience daily peak flows during the hours of maximum water use and are designed to convey the peak flow at 50% to 85% of full flow depth. Separate sanitary sewers may also receive infiltration inflows from surrounding groundwater and during wet-weather conditions, which are accommodated for in the design to ensure partially full flow conditions during peak flows. Storm drains that collect wet-weather flows are designed to run nearly full during their particular design hydrological event, which on average occurs once every 2 to 10 years or longer depending on the return period of the design storm. Combined sewers that convey both sanitary and storm water are subject to both diurnal and wet-weather flows and are designed for just less than full flow for the combined peak flows.

Therefore, the full conveyance capacity of gravity pipes is grossly underutilized. The void space between the surface of the flowing water in a gravity conduit and the conduit perimeter above, known as the headspace, represents significant conveyance capacity, which is either never utilized or only utilized for a small percent of time during the life of the conduit. Given the increase in water conservation, the flow rates and depths in gravity conduits are decreasing making them increasingly more underutilized.

The increasing underutilization of conveyance capacity in gravity conduits coincides with increasing need for conveyance of locally developed water resources, such as recycled water and captured storm water. Many cities are embarking on extensive and costly pipeline construction projects to convey and distribute recycled water in purple-colored pipes to replace and offset freshwater use. Given the often-congested urban setting of these projects, they face alignment, environmental, and permitting challenges that make many such projects infeasible and cause significant delays and increased costs.

Therefore, there is a need for a simple and practical device for co-utilizing the headspace in gravity conduits for both gravity flow when it is needed, and conveyance and distribution of recycled water 0—oand captured storm water when it is not.

SUMMARY OF THE INVENTION

The present invention is a collapsible pressure pipe that is installed in the headspace of the gravity pipe, with its crown touching the soffit of the gravity pipe when pressurized. The pipe has especial provisions for anchorage inside the gravity pipe and segregation from the gravity-flow water.

The collapsible pipe has similar properties to commonly available lay-flat pipes used in fire-fighting and in irrigation. Its lay-flat property allows it to occupy negligible space in the gravity conduit headspace when the headspace is needed for gravity conveyance, and only assumes its circular shape when there is no gravity flow in the headspace. The collapsible pipe of the present invention is equipped with a combined anchorage and segregation system that make up its method of installation and secure its long-term operational integrity and safety.

It is an object of this invention to provide a simple and constructible system of segregated conveyance in gravity conduits.

It is an object of this invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
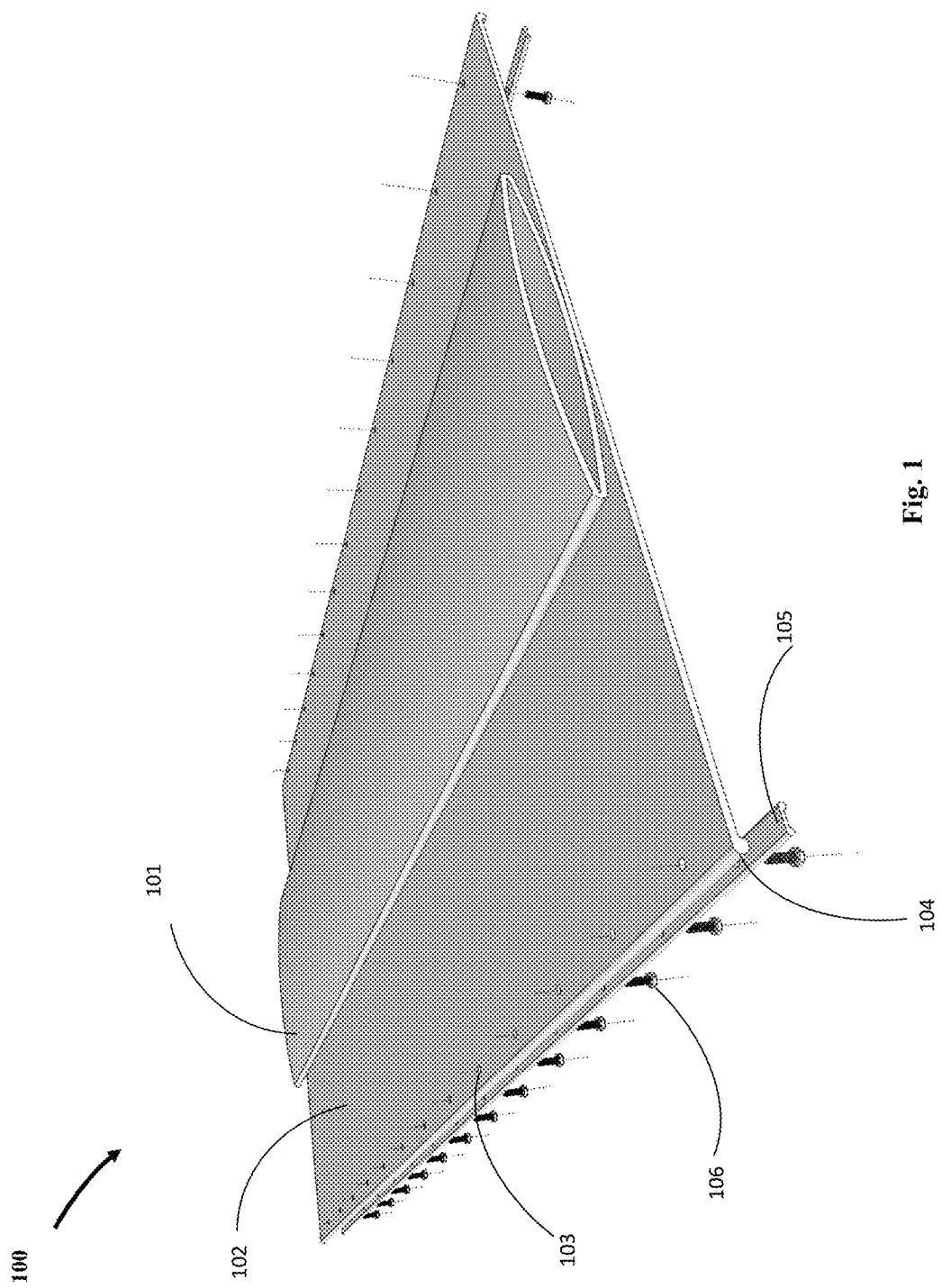
FIG. 1 is a perspective view of one embodiment of the present invention showing a collapsible lay-flat pipe mounted on a flat sheet of flexible and impermeable fabric that can be anchored inside a gravity pipe and support the weight of the lay-flat pipe in the headspace near the gravity pipe soffit, while isolating and segregating it from the gravity pipe flow and interior environment.

Referring to FIG. 1, there is shown the perspective view of one embodiment of the invention 100 comprised of collapsible lay-flat pipe 101, which is attached along its underside to a flat sheet of flexible and impermeable fabric 102 using appropriate adhesive (not shown) along the centerline over a certain width. The fabric 102 has equally spaced anchor holes 103 on its sides and may have thicker round edges 104 to guard against slippage when anchored. Also shown is anchor plate 105 with equally spaced anchor holes that coincide with anchor holes 103 on the fabric 102, each of which fits an anchor bolt 106.

Figure 2:
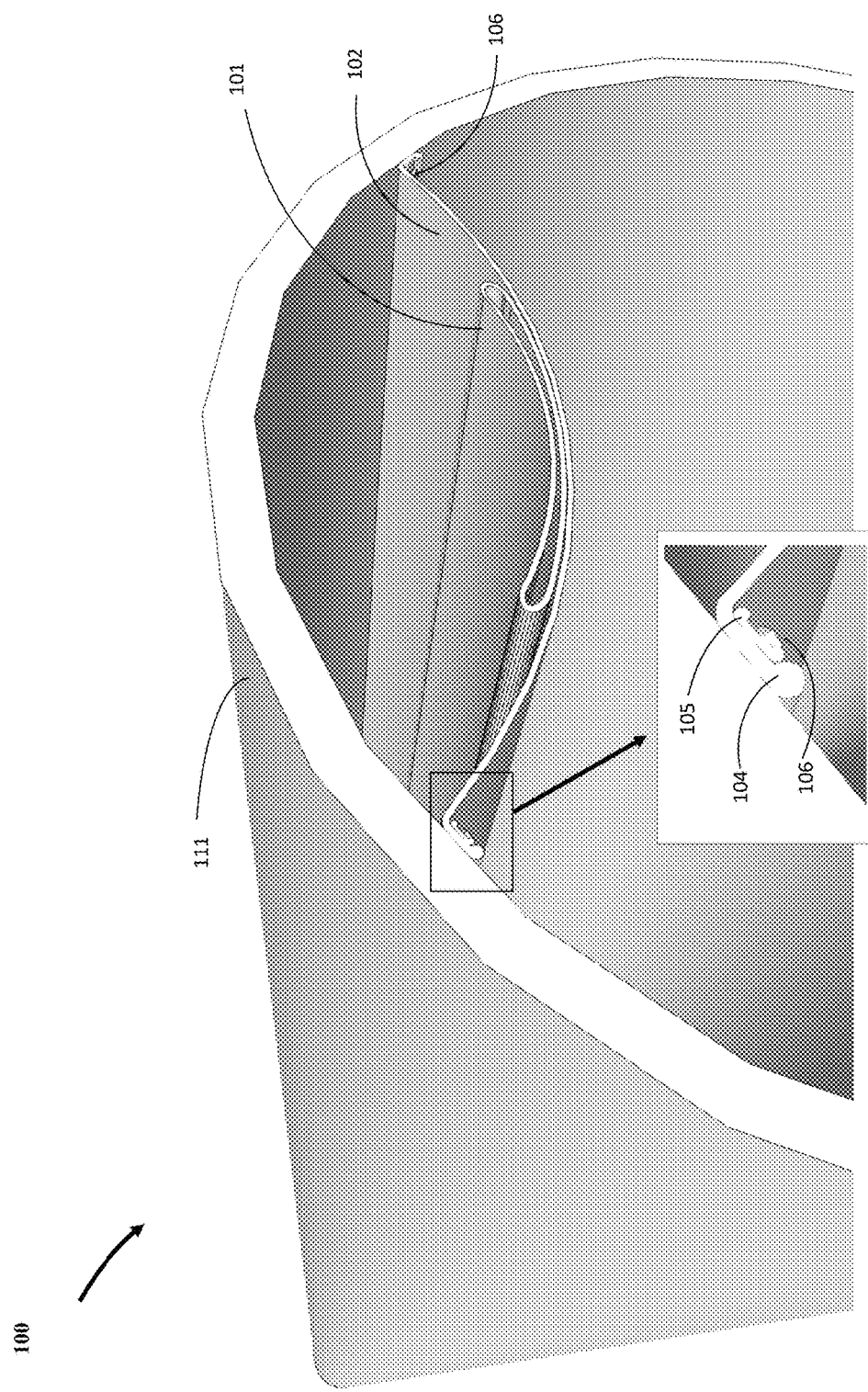
FIG. 2 is a perspective view of the embodiment of the present invention shown in FIG. 1 installed inside a gravity pipe by means of anchoring the flat sheet of flexible and impermeable fabric to the inside of the gravity pipe.

FIG. 2 is a perspective view of the embodiment of the present invention shown in FIG. 1 installed inside a gravity pipe 111. The anchor bolts 106 are firmly secured to the inside of the gravity pipe 111 through the anchor plate 105 and the fabric 102. Correctly sized and spaced holes along two predetermined alignments inside the gravity 111 on opposite sides may be drilled to fit the anchor bolts 106. The drilled holes may be filled with adhesive compound such as epoxy resin (not shown) prior to inserting the bolts 106 for additional anchoring strength and water tightness. The contact area between the fabric 102 and the gravity pipe 111 interior, as well as the contact area between the fabric 102 and the anchor plate 105 may be fitted with appropriate sealing compound (not shown). The purpose would be to isolate the spaces above and below the impermeable fabric 102 and seal the collapsible lay-flat pipe 101 inside the gravity pipe 111 headspace. Provided that the gravity pipe 111 is in good condition and watertight, this arrangement could constitute double-containment of the fluid to be conveyed inside the collapsible lay-flat pipe 101, which may be a health and safety requirements.

Figure 3:
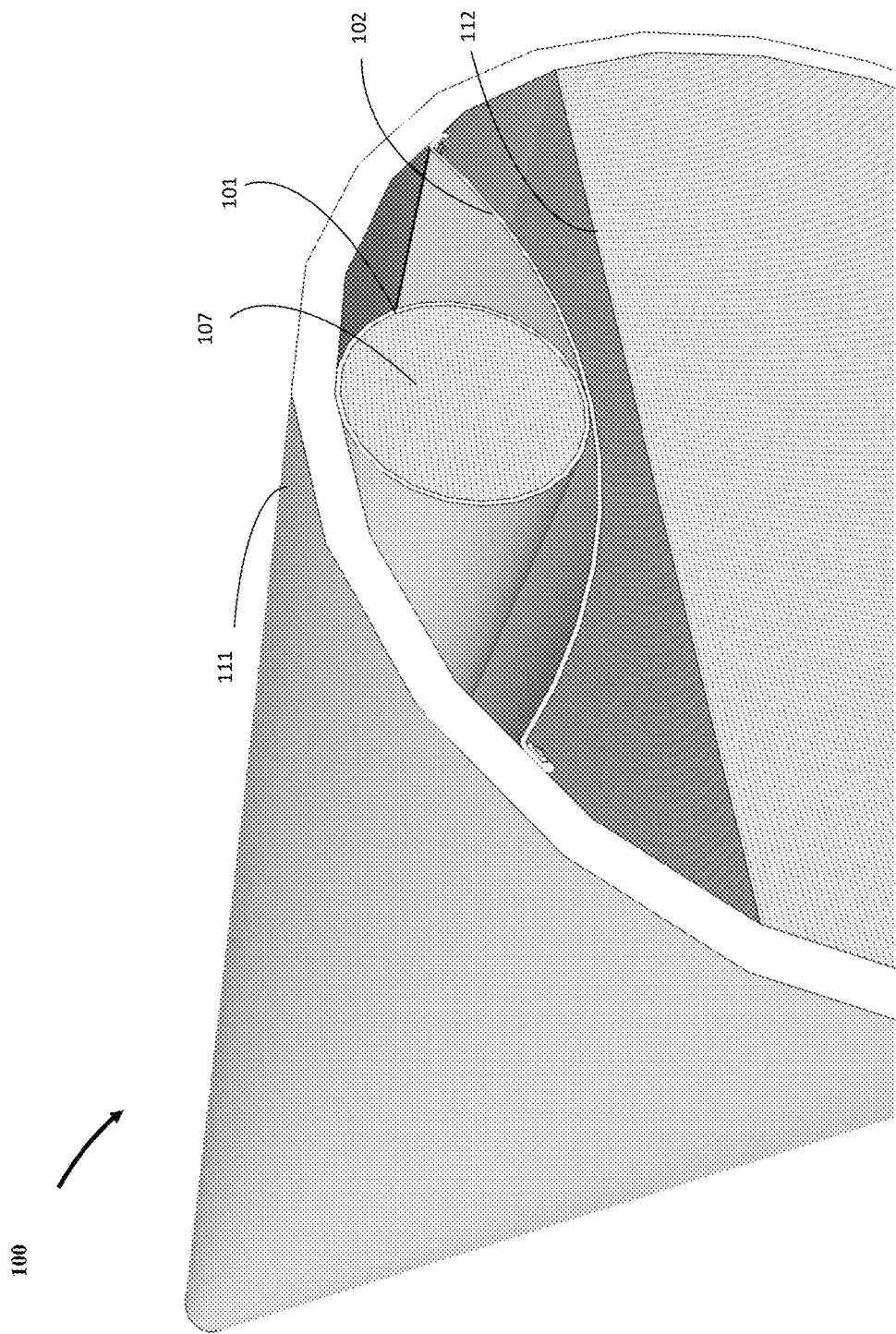
FIG. 3 is a perspective view of the embodiment of the present invention shown in FIG. 2 with the collapsible lay-flat pipe pressurized to convey a fluid during times when the water level in the gravity pipe is below the level of the installed flat sheet of flexible and impermeable fabric.

FIG. 3 is a perspective view of the embodiment of the present invention shown in FIG. 2 with the collapsible lay-flat pipe 101 pressurized to convey a fluid 107 during times when the water level 112 in the gravity pipe 111 is below the level of the installed fabric 102. There is simultaneous, independent, and fully segregated conveyance in both the gravity pipe 111 and the collapsible lay-flat pipe 101. The fabric 102 both supports the weight of the collapsible lay-flat pipe 101 and the fluid 107 inside it as well as isolates it from the gravity pipe 111 flow occurring below.

Figure 4:
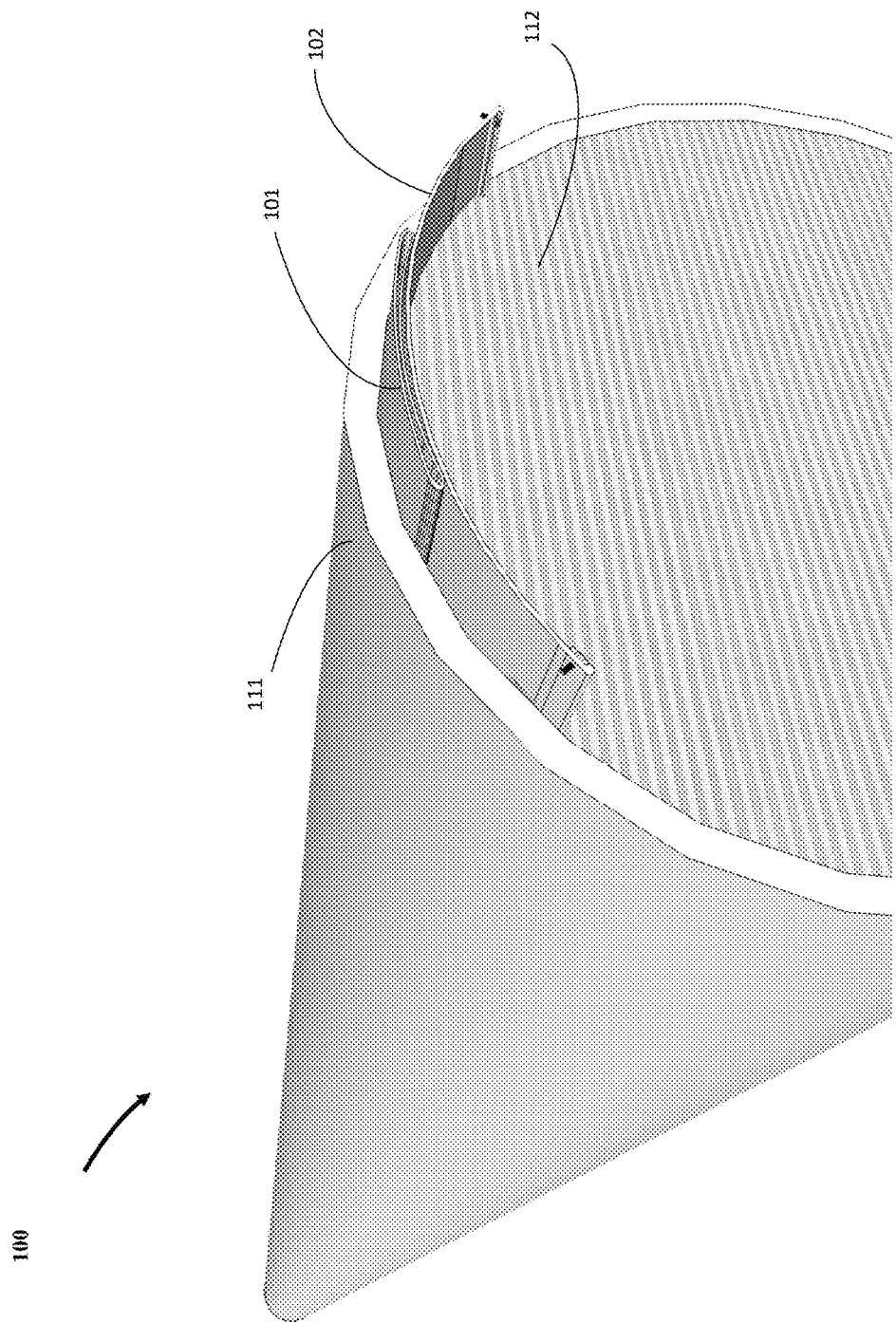
FIG. 4 is a perspective view of the embodiment of the present invention shown in FIG. 2 with the collapsible lay-flat pipe depressurized during times when the water level in the gravity pipe is above the level of the installed collapsible lay-flat pipe such that it causes negligible reduction in the conveyance capacity of the gravity pipe.

FIG. 4 is a perspective view of the embodiment of the present invention shown in FIG. 2 with the collapsible lay-flat pipe 101 depressurized during times when the water level 112 in the gravity pipe 111 is above the level of the installed collapsible lay-flat pipe 101. The water 112 in the gravity pipe 111 exerts pressure on the underside of the fabric 102 pushing it upwards into the headspace thus pressing the collapsible lay-flat pipe against the pipe soffit. This makes the collapsible lay-flat pipe 101 and fabric 102 take the shape of the pipe curvature making the headspace available for gravity flow. The relatively small thickness of the lay-flat pipe 101 and fabric 102 are such that there is negligible reduction in the conveyance capacity of the gravity pipe 111 compared with original.

Figure 5:
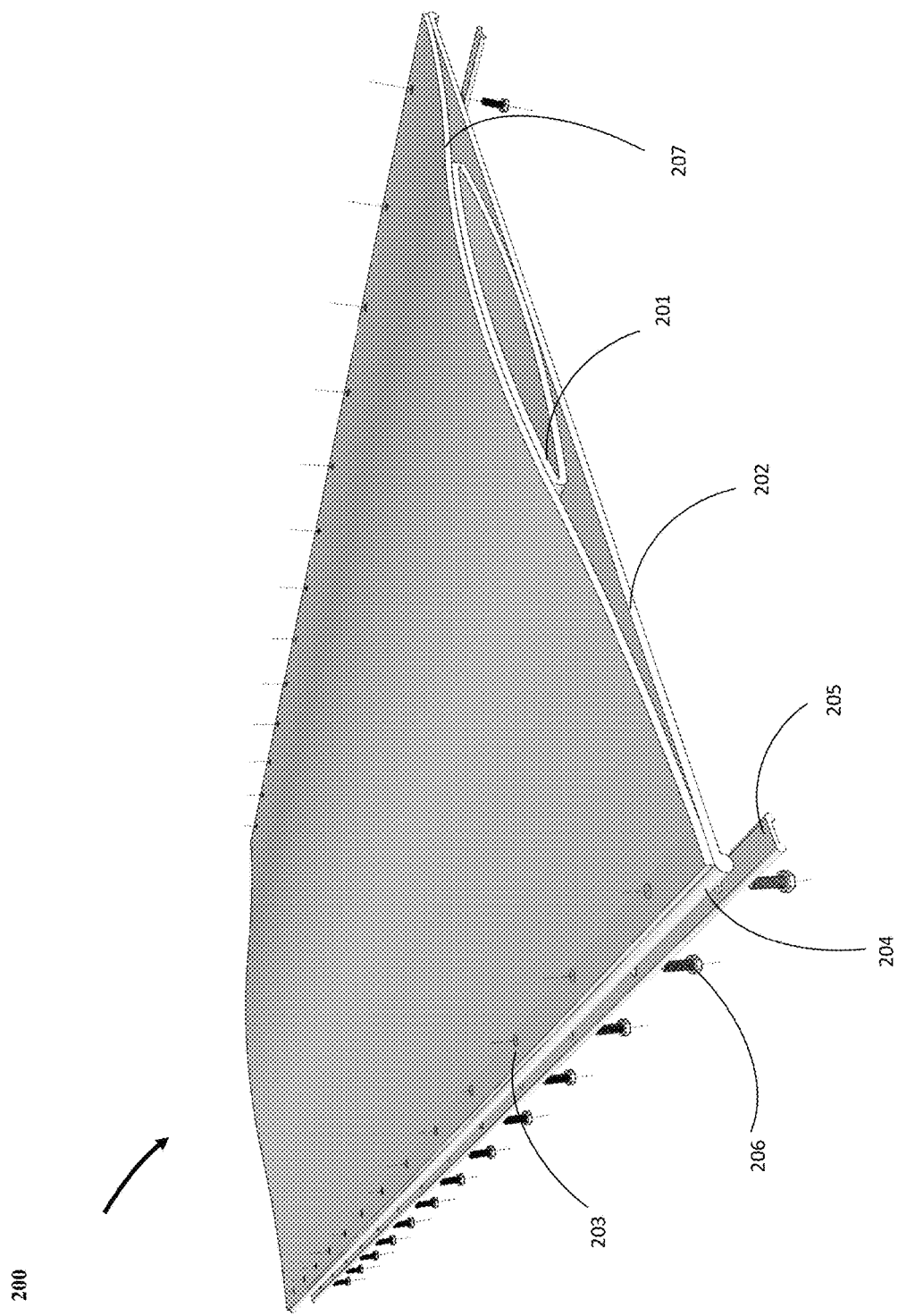
FIG. 5 is a perspective view of another embodiment of the present invention showing a collapsible lay-flat pipe sandwiched between two flat sheets of impermeable fabric that can be anchored inside a gravity pipe and support the lay-flat pipe in the headspace near the gravity pipe soffit while isolating and segregating it from the gravity pipe flow and interior environment.

FIG. 5 there is shown the perspective view of another embodiment of the invention 200 comprised of collapsible lay-flat pipe 201, which is attached along its underside to a flat sheet of flexible and impermeable fabric 102 using appropriate adhesive (not shown) along the centerline over a certain width. There is another flat sheet of flexible and impermeable fabric 207 placed on top of the collapsible lay-flat pipe 201. The fabric 202 under the lay-flat pipe 201 and the fabric 207 over are firmly bonded to one another along their parallel sides forming a fully contained and sealed interior space for the lay-flat pipe 201. There are equally spaced anchor holes 203 on the sides and thicker round edges 204 to guard against slippage when anchored. Also shown is anchor plate 205 with equally spaced anchor holes that coincide with anchor holes 203, each of which fits an anchor bolt 206. This embodiment of the present invention achieves double containment independent of the host gravity pipe.

The present invention is susceptible to modifications and variations which may be introduced thereto without departing from the inventive concepts and the object of the invention. Mechanisms other than those described may be employed to accomplish the main object of the present invention, which is to co-utilize the headspace of gravity pipes for conveyance of another fluid.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. An apparatus for conveying fluids in gravity-flow conduits, the apparatus comprising:
   a collapsible lay-flat pipe disposed to convey a certain fluid under pressure;
   a flat sheet of flexible fabric disposed to support the weight of the said lay-flat pipe during conveyance and forms an impermeable protective barrier;
   a means of longitudinally attaching the said flat sheet of flexible fabric to the interior of a gravity pipe such that the said flat sheet of flexible fabric suspends down symmetrically across the cross section of the said gravity pipe and firmly holds the said lay-flat pipe in position with the crown of the said lay-flat pipe touching the soffit of the said gravity pipe when the said lay-flat pipe is pressurized, the means comprising;
   a plurality of rigid plates of certain length, thickness, and width each having a plurality of holes;
   a plurality of holes along the sides of the said flat sheet of fabric that match the plurality of holes on the said long rigid plates in size and spacing;
   a plurality of bolts disposed to attach the sides of the said flat sheet of flexible fabric to the interior of the said gravity pipe by passing through the holes in the said rigid plates and the holes in the sides of the said flat sheet of fabric and penetrating the interior of the said gravity pipe such that the said bolts are fixed in and firmly press the sides of the said flexible fabric to the interior of the said gravity pipe.

2. The method of claim 1, wherein there is a sealing compound on the contact area between the said flat sheet of flexible fabric and the interior of the said gravity pipe as well as a sealing compound on the contact area between the said flat sheet of flexible fabric and the said rigid plates.

3. An apparatus for conveying fluids in gravity-flow conduits, the apparatus comprising:
   a collapsible lay-flat pipe disposed to convey a certain fluid under pressure;
   a first flat sheet of flexible fabric disposed to support the weight of the said lay-flat pipe during conveyance and form an impermeable protective barrier;
   a second sheet of flexible fabric disposed to cover over the said lay-flat pipe and forms an impermeable protective barrier;
   a means of longitudinally attaching the said flat sheets of flexible fabric to the interior of a gravity pipe such that the said flat sheets of flexible fabric suspend down symmetrically across the cross section of the said gravity pipe with the said first flat sheet of flexible fabric firmly holding the said lay-flat pipe in position and the said second flat sheet of flexible fabric touching the soffit of the said gravity pipe when the said lay-flat pipe is pressurized, the means comprising;
   a plurality of rigid plates of certain length thickness, and width each having a plurality of holes;

a plurality of holes along the sides of the said flat sheets of fabric that match the plurality of holes on the said long rigid plates in size and spacing;

a plurality of bolts disposed to attach the sides of the said flat sheet of flexible fabric to the interior of the said gravity pipe by passing through the holes in the said rigid plates and the holes in the sides of the said flat sheets of flexible fabric and penetrating the interior of the said gravity pipe such that the said bolts are fixed in the said gravity pipe and firmly press the sides of the said flat sheets of flexible fabric to the interior of the said gravity pipe.

\* \* \* \* \*